United States Patent
Wilensky et al.

(10) Patent No.: US 7,701,470 B2
(45) Date of Patent: Apr. 20, 2010

(54) STABLE MASK COMBINATION IN DIGITAL IMAGE EDITING

(75) Inventors: Gregg D. Wilensky, San Francisco, CA (US); Jen-Chan Chien, Saratoga, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 623 days.

(21) Appl. No.: 11/610,274

(22) Filed: Dec. 13, 2006

(65) Prior Publication Data

US 2008/0143740 A1 Jun. 19, 2008

(51) Int. Cl.
*G09G 5/00* (2006.01)
(52) U.S. Cl. .................... 345/626; 345/620
(58) Field of Classification Search .......... 345/626, 345/620, 619; 716/19
See application file for complete search history.

(56) References Cited

U.S. PATENT DOCUMENTS

| | | | |
|---|---|---|---|
| 5,007,001 A | | 4/1991 | Lloyd-Williams |
| 5,469,536 A | | 11/1995 | Blank |
| 5,852,673 A | | 12/1998 | Young |
| 6,226,000 B1 * | 5/2001 | Richens et al. ........... 345/419 |
| 6,470,489 B1 * | 10/2002 | Chang et al. ............... 716/21 |
| 6,920,250 B1 | 7/2005 | Kletter et al. |
| 7,215,827 B2 * | 5/2007 | Ito et al. .................... 382/283 |
| 2003/0011761 A1 | 1/2003 | Gilat-Bernshtein et al. |
| 2003/0128374 A1 | 7/2003 | Brothers et al. |
| 2004/0008886 A1 * | 1/2004 | Boykov .................... 382/173 |
| 2006/0244748 A1 | 11/2006 | Long et al. |

OTHER PUBLICATIONS

Bauer, Peter, "Special Edition Using Adobe Photoshop CS and Illustrator CS", Que Publishing, 2004, chpt. 9, 34.*
International Search Report for PCT/US 07/86581, mailed Sep. 25, 2008.

* cited by examiner

*Primary Examiner*—Michelle K Lay
(74) *Attorney, Agent, or Firm*—Robert C Kowert; Meyertons, Hood, Kivlin, Kowert & Goetzel, P.C.

(57) ABSTRACT

A method, system, and computer-readable storage medium are disclosed for combining raster image masks in a digital image. A first raster image mask may be generated that comprises a first set of one or more pixels having a first intermediate value for membership in the first raster image mask. A second raster image mask may be generated that comprises the first set of one or more pixels having a second intermediate value for membership in the second raster image mask. The first raster image mask and the second raster image mask may be combined to generate a third raster image mask, wherein a boundary of the third raster image mask is not greater than a combined boundary of the first raster image mask and the second raster image mask.

36 Claims, 8 Drawing Sheets

Generate a first raster image mask in a digital image, wherein the first raster image mask comprises a first set of one or more pixels having a first intermediate value for membership in the first raster image mask
500

Generate a second raster image mask in the digital image, wherein the second raster image mask comprises the first set of one or more pixels having a second intermediate value for membership in the second raster image mask
510

Combine the first raster image mask and the second raster image mask to generate a third raster image mask in the digital image, wherein a boundary of the third raster image mask is not greater than a combined boundary of the first raster image mask and the second raster image mask
520

Figure 5

Generate a first raster image mask in a digital image, wherein the first raster image mask comprises a first set of one or more pixels having a first intermediate value for membership in the first raster image mask
500

Generate a second raster image mask in the digital image, wherein the second raster image mask comprises the first set of one or more pixels having a second intermediate value for membership in the second raster image mask
510

Add the first raster image mask and the second raster image mask to generate a third raster image mask in the digital image, wherein each pixel in the third raster image mask has a maximum of a respective value in the first raster image mask and a respective value in the second raster image mask
522

Figure 6

Generate a first raster image mask in a digital image, wherein the first raster image mask comprises a first set of one or more pixels having a first intermediate value for membership in the first raster image mask
500

Generate a second raster image mask in the digital image, wherein the second raster image mask comprises the first set of one or more pixels having a second intermediate value for membership in the second raster image mask
510

Add the first raster image mask and the second raster image mask to generate a third raster image mask in the digital image, wherein each pixel in the third raster image mask has a value of a respective value in the first raster image mask plus a respective value in the second raster image mask minus a square root of a product of the respective value in the first raster image mask and the respective value in the second raster image mask
524

Figure 7

Generate a first raster image mask in a digital image, wherein the first raster image mask comprises a first set of one or more pixels having a first intermediate value for membership in the first raster image mask
500

Generate a second raster image mask in the digital image, wherein the second raster image mask comprises the first set of one or more pixels having a second intermediate value for membership in the second raster image mask
510

Subtract the first raster image mask or the second raster image mask from the other to generate a third raster image mask in the digital image, wherein each pixel in the third raster image mask has a minimum of a respective value in the first raster image mask and a respective value in the second raster image mask
526

Figure 8

Generate a first raster image mask in a digital image, wherein the first raster image mask comprises a first set of one or more pixels having a first intermediate value for membership in the first raster image mask
500

Generate a second raster image mask in the digital image, wherein the second raster image mask comprises the first set of one or more pixels having a second intermediate value for membership in the second raster image mask
510

Subtract the first raster image mask or the second raster image mask from the other to generate a third raster image mask in the digital image, wherein each pixel in the third raster image mask has a value of a respective value in the first raster image mask plus a respective value in the second raster image mask minus one plus a square root of a product of a complement of the respective value in the first raster image mask and a complement of the respective value in the second raster image mask
528

STABLE MASK COMBINATION IN DIGITAL IMAGE EDITING

BACKGROUND

1. Field of the Invention

The present invention is directed to computer systems; and more particularly, it is directed to the editing of digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited bitmap editors suitable for relatively simple operations such as rotating and cropping images; and professional-grade programs such as Adobe Photoshop®, Adobe Illustrator®, and Adobe AfterEffects® (all available from Adobe Systems, Inc.) with large and complex feature sets.

Digital images may include raster graphics, vector graphics, or a combination thereof. Raster graphics data (also referred to herein as bitmaps) may be stored and manipulated as a grid of individual picture elements called pixels. Suitable image editors may be used to modify pixels (e.g., values such as hue, brightness, saturation, transparency, etc.) on a pixel-by-pixel basis or as a group. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. A black and white bitmap may require less space (e.g., one bit per pixel). Raster graphics are often used for photographs and photo-realistic images.

Vector graphics data may be stored and manipulated as one or more geometric objects. The geometric primitives (e.g., points, lines, polygons, Bézier curves, and text characters) may be based upon mathematical equations to represent parts of digital images. Suitable image editors may be used to perform operations on these objects such as rotation, translation, stretching, skewing, changing depth order, and combining with other objects. Vector graphics are often rasterized, or converted to raster graphics data, in the process of displaying the data on a display device or printing the data with a printer. While raster graphics may often lose apparent quality when scaled to a higher resolution, vector graphics may scale to the resolution of the device on which they are ultimately rendered. Therefore, vector graphics are often used for images that are sought to be device-independent, such as in typesetting and graphic design.

Many digital image editing operations may be applied selectively to a portion of the digital image. In selecting a portion of the digital image, a mask may be used to define a portion of a digital image on which an operation is sought to be performed. In general, a mask may comprise any image having a single color channel (e.g., a grayscale image). As used herein, a mask used in raster graphics is referred to as a "raster image mask."

Masks may be used for various purposes. For example, an alpha channel may be a raster image mask which is used to form one component of a color image or the single component of a grayscale image. A layer mask may be used to modulate the blending of two layers (e.g., by removing or "masking" a portion of one or more layers from the final image). Suitable operations may be applied to modify the mask. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks.

A hard mask may represent a binary, "all or nothing" inclusion or exclusion of pixels. A soft mask may comprise a raster image mask having some intermediate values which lie between the minimum and maximum values for membership in the mask. For example, a soft mask may potentially comprise integer values between 0 and 255 or floating-point values between 0 and 1. Soft masks may be used for gradual blending of selected pixels into surrounding regions of the digital image. For example, a soft mask may be used in applying a feathered brushstroke in a digital image.

A selection may represent a region of interest in the digital image and may include one or more pixels (comprising one or more color channels) and/or geometric objects. A selection may be represented by a raster image mask having a single channel indicating per-pixel membership in the selection. If the mask is a soft mask, then the selection may have elements with partial membership (e.g., feathered edges) indicated by an intermediate value in the raster image mask. In most digital image editors, selections may be generated in various ways. For example, a marquee tool may permit the selection of rectangular or elliptical areas in an image. A lasso tool may allow the user to draw a freehand selection area. A magic wand tool may permit the selection of parts of an image based on a color range of pixels. Facilities such as edge detection, masking, alpha compositing, and color and channel-based extraction may also be used to generate selections. The pixels and/or objects in the selection may be contiguous or non-contiguous. Suitable operations may be applied to modify the selection itself. For example, a border operation may produce a selection that borders the edges of the original selection. Expand and contract operations may respectively make the selection larger or smaller. A smooth operation may smooth out irregularities in the selection. A feather operation may add softness to the edges of the selection.

In applying various types of soft masks to a digital image (e.g., selections, brush strokes, etc.), tools with additive or subtractive properties may be used. For example, selection tools may operate in combination modes such as "add to selection," "subtract from selection," and "intersect with selection." Using a prior approach, however, repeated strokes of the tool over the same part of the image may cause the resulting mask to expand in size at the site of the overlap with each additional stroke. Therefore, this approach is not idempotent because repetition of the same operation does not yield the same result every time.

SUMMARY

Various embodiments of systems, methods, and computer-readable storage media are disclosed for combining masks in a digital image. According to one embodiment, a first raster image mask may be generated in a digital image. The first raster image mask may be a soft mask that comprises a first set of one or more pixels having a first intermediate value for membership in the first raster image mask. The first intermediate value is less than a maximum value for membership in the first raster image mask (e.g., indicating full inclusion) and greater than a minimum value for membership in the first raster image mask (e.g., indicating full exclusion). A second raster image mask may be generated in the digital image. The second raster image mask may overlap the first raster image mask at least at the first set of one or more pixels. In the second raster image mask, the first set of one or more pixels may have a second intermediate value for membership in the second raster image mask. The second intermediate value is less than a maximum value for membership in the second raster image mask (e.g., indicating full inclusion) and greater than a minimum value for membership in the second raster image mask (e.g., indicating full exclusion). The first intermediate value and the second intermediate value may be the same value or different values. Either of the raster image masks may comprise a selection, a brush stroke, or another suitable mask. In one embodiment, the first raster image mask and/or the second raster image mask may be generated by a graph-cut technique (i.e., an algorithm for finding a globally optimal segmentation solution).

The first raster image mask and the second raster image mask may be combined to generate a third raster image mask in the digital image. A boundary of the third raster image mask may not be substantially greater than a combined boundary of the first raster image mask and the second raster image mask (i.e., the boundary of the first raster image mask as overlaid with the boundary of the second raster image mask). According to one embodiment, the first raster image mask and the second raster image mask may be combined using an idempotent addition operation or an idempotent subtraction operation to generate the third raster image mask. According to one embodiment, the third mask $M_3$ may be generated from the first mask $M_1$ and the second mask $M_2$ as follows: $M_3=\max(M_1, M_2)$. According to another embodiment, the third mask $M_3$ may be generated from the first mask $M_1$ and the second mask $M_2$ as follows: $M_3=\min(M_1, M_2)$.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents, and alternatives falling within the spirit and scope of the present invention as defined by the appended claims.

DETAILED DESCRIPTION OF EMBODIMENTS

Various embodiments may provide systems and methods for stable combination of masks in a digital image. A plurality of masks may be combined (e.g., with additive or subtractive properties) such that additions of the same region to the result do not increase the boundaries of the result beyond the boundaries of the combined masks. Idempotent addition and subtraction operations may be used on the masks to generate the stable result.

FIGS. 1 through 4 are block diagrams illustrating embodiments of a digital image editing program configured for stable combination of masks. A digital image editing program 100 may comprise a plurality of image editing operations 120. In one embodiment, a suitable product such as Adobe Photoshop®, Adobe Illustrator®, or Adobe AfterEffects® (all available from Adobe Systems, Inc.) may be used as the image editor 100. The image editing program 100 may be used to create and/or modify a digital image 110. The image editing operations 120 may comprise suitable operations for modifying pixels and geometric objects of the digital image 110 as well as masks and selections. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to masks. For example, a border operation may produce a selection that borders the edges of an original selection. Expand and contract operations may respectively make the selection larger or smaller. A smooth operation may smooth out irregularities in the selection. A feather operation may add softness to the edges of the selection.

Figure 1:
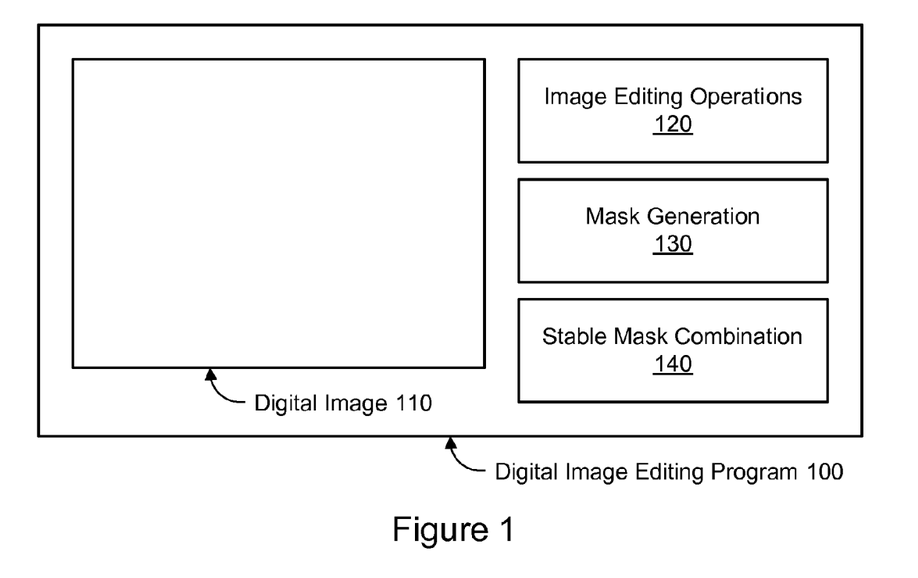
FIGS. 1 through 4 are block diagrams illustrating embodiments of a digital image editing program configured for stable combination of masks.
Figure 2:
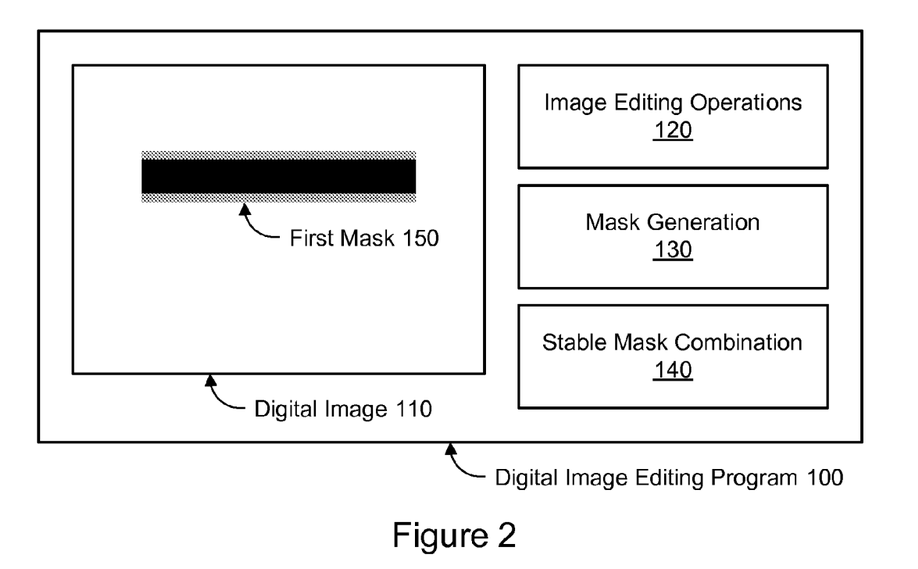
Figure 3:
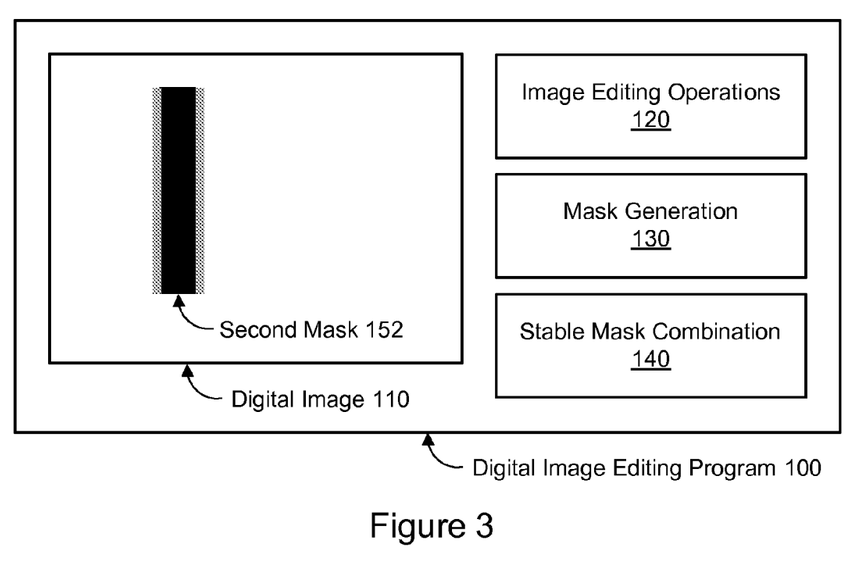
Figure 10:
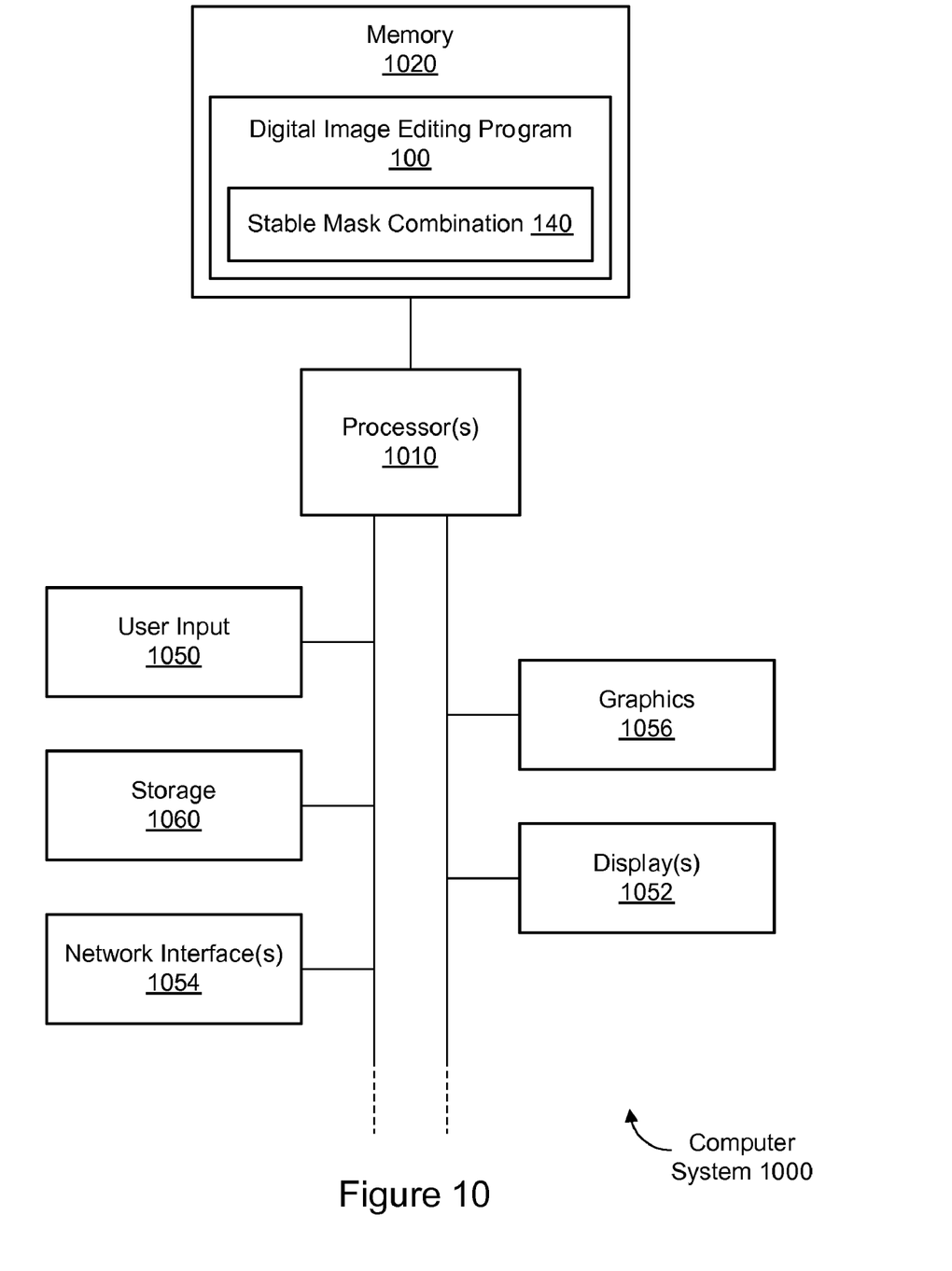
FIG. 10 is a block diagram illustrating constituent elements of a computer system that is configured to implement embodiments of the systems and methods for digital image editing with stable mask combination.

Using mask generation facilities 130, a portion of the digital image 110 may be defined as mask (e.g., a raster image mask such as a selection or paintbrush). The mask generation facilities 130 may comprise various tools for generating selections (e.g., a marquee tool, lasso tool, magic wand tool, and other suitable tools and interactive dialogs) and/or other types of masks. As will be discussed in greater detail below, facilities for stable mask combination 140 may be provided. The mask generation facilities 130 and stable mask combination facilities 140 may comprise program instructions that may be executed in association with the image editor 100. In various embodiments, the program instructions for mask generation and stable mask combination may be coded as an intrinsic part of the image editor 100 or as a plug-in module or other extension to the image editor 100. As shown in FIG. 10, the image editing program 100 and its constituent elements and data may be stored in a memory 1020 of a computer system 1000.

Using the mask generation facilities 130, a first raster image mask 150 may be generated in the digital image 110. The first mask 150 may be a soft mask that includes one or more pixels having intermediate values. For example, if full exclusion from the first mask is indicated by a value of zero, and if full inclusion in the first mask is indicated by a value of one, then a range of intermediate values between zero and one (e.g., 0.5) may indicate partial or "soft" inclusion in the first mask 150. Alternatively, integer values in an appropriate range (e.g., 0 and 255) may be used. This partial inclusion of some pixels may be used for transparency effects, feathering effects, blending effects, etc. In the example shown in FIG. 2, the first mask 150 may include a central region having the maximum value and two edges having one or more intermediate values. If an identical soft mask is applied in addition to the first mask 150, then the stable mask combination 140 may ensure that the resulting combination is substantially the same as the first mask 150. In other words, the combination may include substantially the same pixels having the same values as the first mask 150.

Again using the mask generation facilities 130, a second raster image mask 152 may be generated in the digital image 110. The second mask 152 may be a soft mask that includes one or more pixels having intermediate values. In the example shown in FIG. 3, the second mask 152 may include a central region having the maximum value and two edges having one or more intermediate values. If an identical soft mask is applied in addition to the second mask 152, then the stable mask combination 140 may ensure that the resulting combination is substantially the same as the second mask 152. In other words, the combination may include substantially the same pixels having the same values as the second mask 152.

Figure 4:
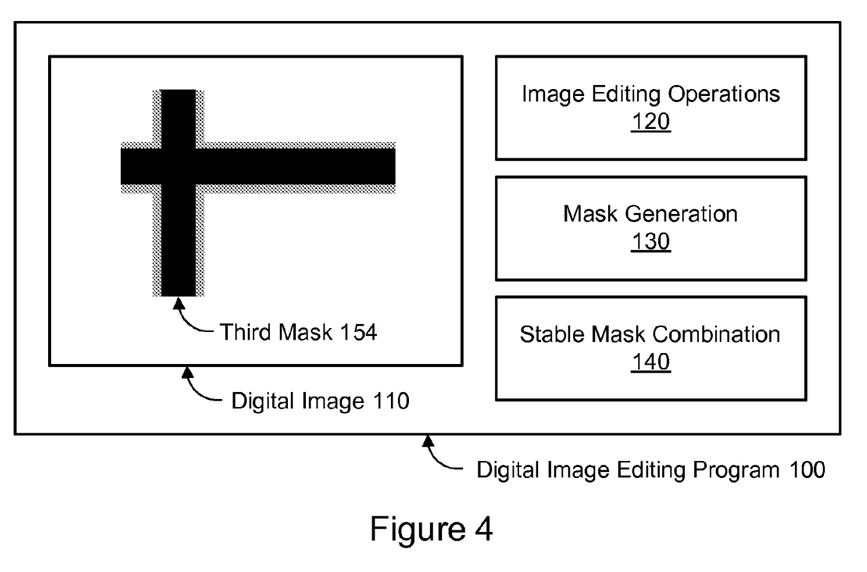

FIG. 4 is a block diagram illustrating an embodiment of a digital image editing program configured for stable combination of the first mask 150 and second mask 152. As discussed with reference to FIGS. 2 and 3, both the first mask 150 and the second mask 152 may comprise soft masks, each with intermediate values for one or more pixels included in the mask. In various embodiments, the first mask 150 and the second mask 152 may comprise masks of differing types (e.g., a selection and a brushstroke) and/or masks generated by different techniques. The first mask 150 and second mask 152 may be combined to generate a third mask 154 using the facilities for stable mask combination 140. The third mask 154 may comprise a soft image raster mask. The boundaries of the third mask 154 may not extend substantially beyond the boundaries of the first mask 150 and second mask 152. For example, at the four "soft" corners of the intersection of the first mask 150 and second mask 152 as illustrated in FIG. 4, the combined third mask 154 does not reflect unwanted expansion of the "soft" overlapping region. In this manner, a plurality of masks may be applied to a digital image 110 sequentially such that a stable result is generated.

Figure 5:
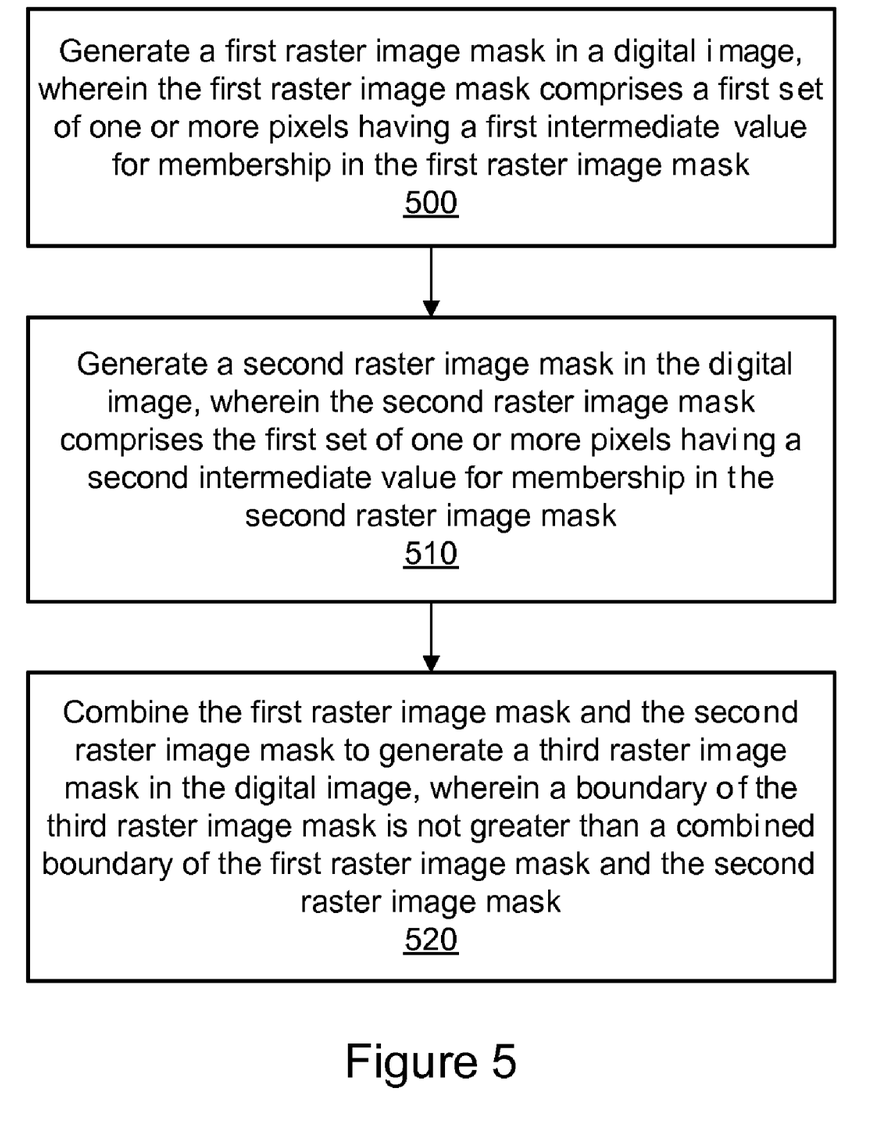
FIG. 5 is a flow diagram illustrating one embodiment of a method for editing a digital image with stable mask combination.

FIG. 5 is a flow diagram illustrating one embodiment of a method for editing a digital image with stable mask combination. As shown in block 500, a first raster image mask may be generated in a digital image. The first raster image mask may be a soft mask that comprises a first set of one or more pixels having a first intermediate value for membership in the first raster image mask. The first intermediate value is less than a maximum value for membership in the first raster image mask (e.g., indicating full inclusion) and greater than a minimum value for membership in the first raster image mask (e.g., indicating full exclusion).

As shown in block 510, a second raster image mask may be generated in the digital image. The second raster image mask may overlap the first raster image mask at least at the first set of one or more pixels. In the second raster image mask, the first set of one or more pixels may have a second intermediate value for membership in the second raster image mask. The second intermediate value is less than a maximum value for membership in the second raster image mask (e.g., indicating full inclusion) and greater than a minimum value for membership in the second raster image mask (e.g., indicating full exclusion). The first intermediate value and the second intermediate value may be the same value or different values.

As shown in block 520, the first raster image mask and the second raster image mask may be combined to generate a third raster image mask in the digital image. By use of the stable mask combination facilities discussed above, a boundary of the third raster image mask may not be substantially greater than a combined boundary of the first raster image mask and the second raster image mask (i.e., the boundary of the first raster image mask as overlaid with the boundary of the second raster image mask). As will be discussed in greater detail with respect to FIGS. 6 through 9, the first raster image mask and the second raster image mask may be combined using an idempotent addition operation or an idempotent subtraction operation to generate the third raster image mask.

Any of the raster image masks may comprise a selection, a brush stroke, or another suitable mask. In one embodiment, the first raster image mask and/or the second raster image mask may be generated by a graph-cut technique (i.e., an algorithm for finding a globally optimal segmentation solution). In one embodiment, the first raster image mask and/or the second raster image mask may be defined by path operators.

The raster image masks may be combined dynamically in response to user input. For example, successive strokes of a soft brush tool or soft selection tool may be combined in real time such that the result is updated dynamically with each successive stroke. In one embodiment, user input to influence the combination of the masks may be obtained interactively and dynamically. In the interactive mode, this user input may be obtained in association with the generation of the second mask or subsequent mask(s). For example, the user may choose to combine the second mask or subsequent mask(s) with the first mask in either an additive or subtractive manner. In one embodiment, the user input in the interactive mode may instruct the digital image editing program 100 to convert a selection or path to a mask in order to combine the selection or path with a previously generated mask. The user input may be submitted dynamically, as additional masks are generated, to control the combination of the masks. The user input may be obtained through various traditional GUI (graphical user interface) techniques such as contextual menus, dialog boxes, the choice of tools chosen from a palette, etc.

Figure 6:
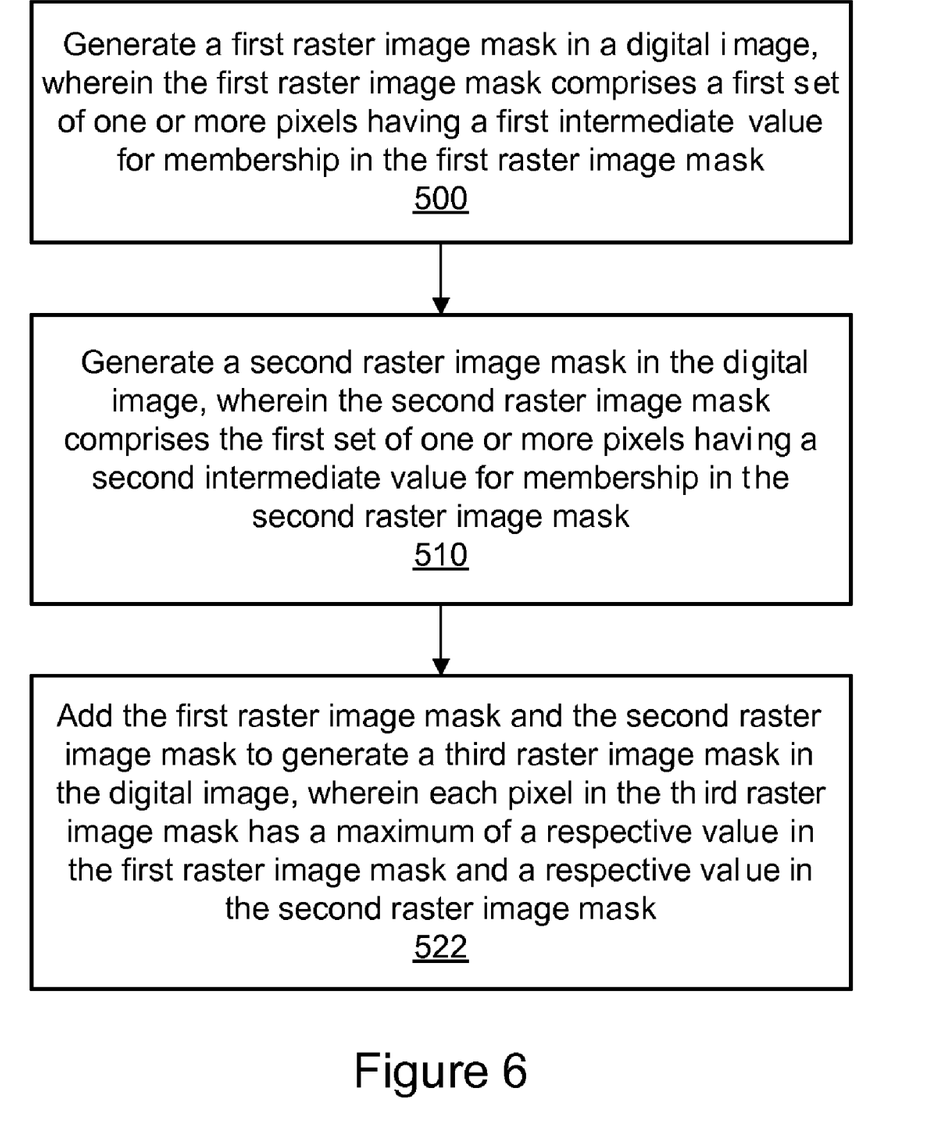
FIGS. 6 and 7 are flow diagrams illustrating embodiments of a method for editing a digital image with stable mask combination including addition of masks.

FIG. 6 is a flow diagram illustrating an embodiment of a method for editing a digital image with stable mask combination including addition of masks. Block 522 may represent a specific implementation of block 520 in one embodiment. As shown in block 522, the first raster image mask and the second raster image mask may be combined by adding the first raster image mask to the second raster image mask to generate the third raster image mask. In adding the masks, each pixel in the third raster image mask may be assigned the maximum of the respective value in the first raster image mask and the respective value in the second raster image mask. Thus, the third mask $M_3$ may be generated from the first mask $M_1$ and the second mask $M_2$ as follows, where the range of values is between 0 and 1:

$$M_3 = \max(M_1, M_2)$$

Figure 7:
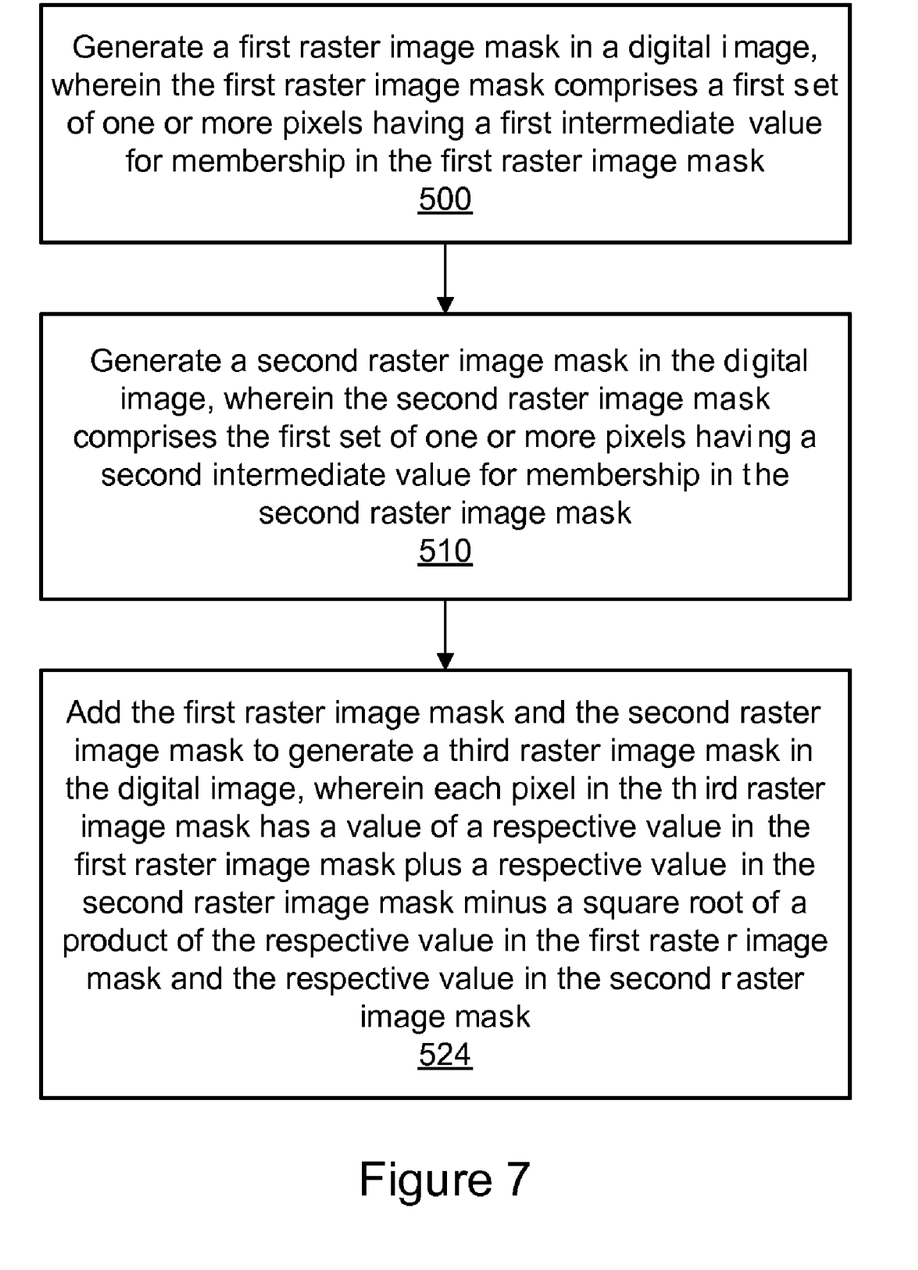

FIG. 7 is a flow diagram illustrating an embodiment of a method for editing a digital image with stable mask combination including addition of masks. Block 524 may represent a specific implementation of block 520 in one embodiment. As shown in block 524, the first raster image mask and the second raster image mask may be combined by adding the first raster image mask to the second raster image mask to generate the third raster image mask. In adding the masks, each pixel in the third raster image mask may be assigned the value of the respective value in the first raster image mask plus the respective value in the second raster image mask minus the square root of the product of the respective value in the first raster image mask and the respective value in the second raster image mask. Thus, the third mask $M_3$ may be generated from the first mask $M_1$ and the second mask $M_2$ as follows, where the range of values is between 0 and 1:

$$M_3 = M_1 + M_2 - \mathrm{sqrt}(M_1 * M_2)$$

Figure 8:
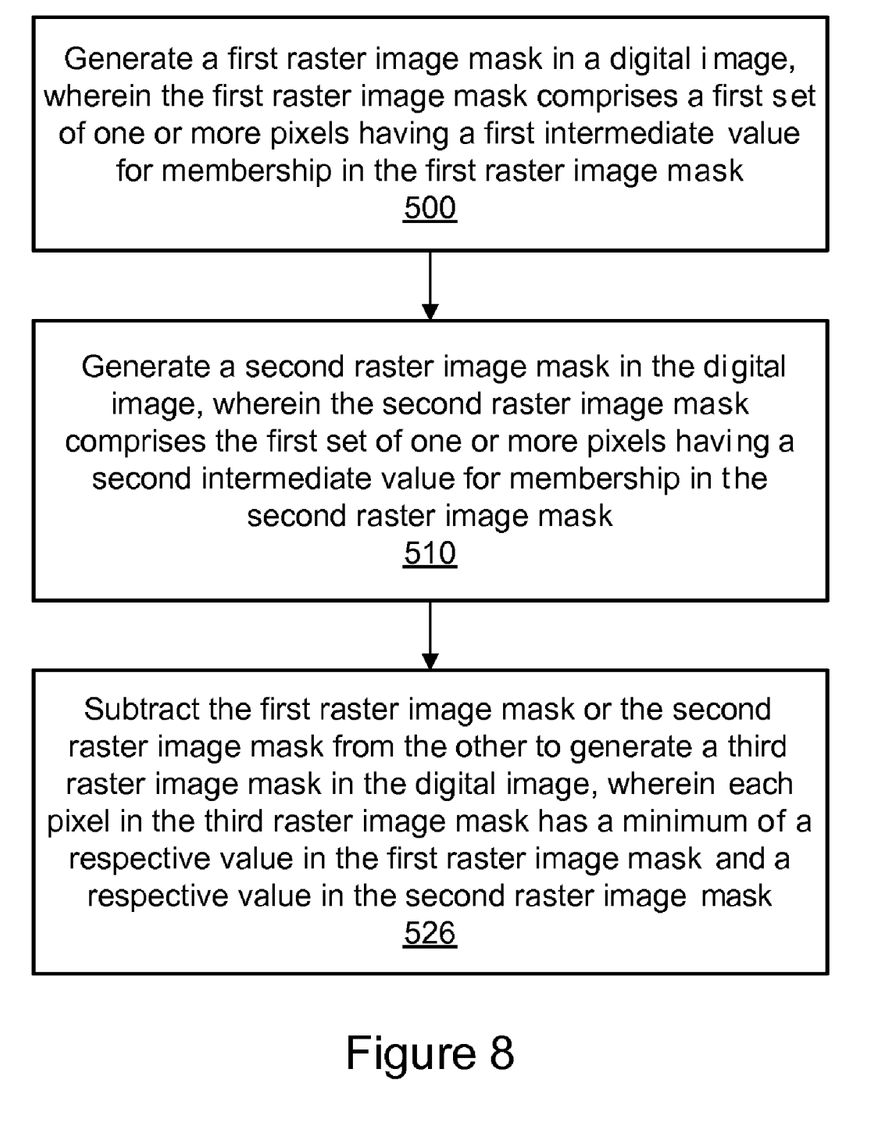
FIGS. 8 and 9 are flow diagrams illustrating embodiments of a method for editing a digital image with stable mask combination including subtraction of masks.

FIG. 8 is a flow diagram illustrating an embodiment of a method for editing a digital image with stable mask combination including subtraction of masks. Block 526 may represent a specific implementation of block 520 in one embodiment. As shown in block 526, the first raster image mask and the second raster image mask may be combined by subtracting the first raster image mask from the second raster image mask or subtracting the second raster image mask from the first raster image mask to generate the third raster image mask. In subtracting the masks, each pixel in the third raster image mask may be assigned the minimum of the respective value in the first raster image mask and the respective value in the second raster image mask. Thus, the third mask $M_3$ may be generated from the first mask $M_1$ and the second mask $M_2$ as follows, where the range of values is between 0 and 1:

$$M_3 = \min(M_1, M_2)$$

Figure 9:
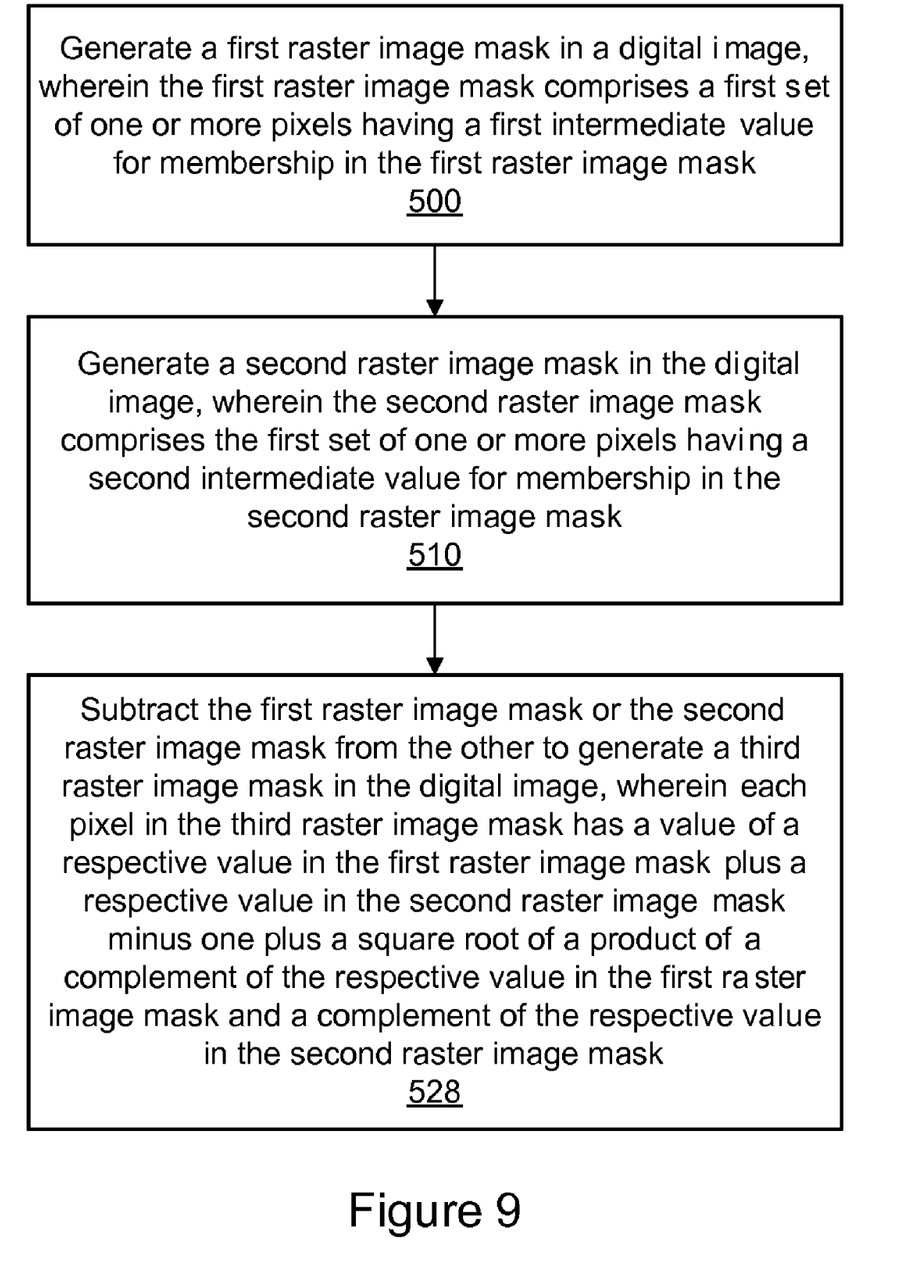

FIG. 9 is a flow diagram illustrating an embodiment of a method for editing a digital image with stable mask combination including subtraction of masks. Block 528 may represent a specific implementation of block 520 in one embodiment. As shown in block 526, the first raster image mask and the second raster image mask may be combined by subtracting the first raster image mask from the second raster image mask or subtracting the second raster image mask from the first raster image mask to generate the third raster image mask. In subtracting the masks, each pixel in the third raster image mask may be assigned the value of the respective value in the first raster image mask plus the respective value in the second raster image mask minus one plus the square root of the product of the complement of the respective value in the first raster image mask and the complement of the respective value in the second raster image mask. Thus, the third mask $M_3$ may be generated from the first mask $M_1$ and the second mask $M_2$ as follows, where the range of values is between 0 and 1:

$$M_3 = M_1 + M_2 - 1 + \mathrm{sqrt}((1-M_1)*(1-M_2))$$

This formula may alternatively be expressed as follows:

$$M_3 = 1 - (1-M_1) - (M_1 - M_2) + \mathrm{sqrt}((1-M_1)*(1-M_2))$$

In various embodiments, any of the operations shown in FIGS. 5 through 9 may be performed automatically (i.e., without user intervention) and/or programmatically (i.e., by a computer according to a computer program). In various embodiments, any of the operations shown in FIGS. 5 through 9 may be performed in different orders and combinations than that which is illustrated.

FIG. 10 is a block diagram illustrating constituent elements of a computer system 1000 that is configured to implement embodiments of the systems and methods disclosed herein for editing a digital image using stable mask combination. The computer system 1000 may include one or more processors 1010 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1000, such as various versions of Unix, Linux, Windows™ from Microsoft Corporation, Mac OS™ from Apple Corporation, or any other operating system that enables the operation of software on a hardware platform. The processor(s) 1010 may be coupled to one or more of the other illustrated components, such as a memory 1020, by at least one communications bus.

In one embodiment, a graphics card or other graphics component 1056 may be coupled to the processor(s) 1010. The graphics component 1056 may comprise a graphics processing unit (GPU) and local video memory (e.g., VRAM) for efficiently performing specialized graphics tasks. Additionally, the computer system 1000 may include one or more displays 1052. In one embodiment, the display(s) 1052 may be coupled to the graphics card 1056 for display of data provided by the graphics card 1056.

Program instructions that may be executable by the processor(s) 1010 to implement aspects of the techniques described herein may be partly or fully resident within the memory 1020 at the computer system 1000 at any point in time. For example, the program instructions may comprise a digital image editing program 100 including stable mask combination 140 as shown in FIGS. 1 through 4. The memory 1020 may be implemented using any appropriate medium such as any of various types of ROM or RAM (e.g., DRAM, SDRAM, RDRAM, SRAM, etc.), or combinations thereof. The program instructions may also be stored on a storage device 1060 accessible from the processor(s) 1010. Any of a variety of storage devices 1060 may be used to store the program instructions in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1060 may be coupled to the processor(s) 1010 through one or more storage or I/O interfaces. In some embodiments, the program instructions may be provided to the computer system 1000 via any suitable computer-readable storage medium including the memory 1020 and storage devices 1060 described above.

The computer system 1000 may also include one or more additional I/O interfaces, such as interfaces for one or more user input devices 1050. In addition, the computer system 1000 may include one or more network interfaces 1054 providing access to a network. It should be noted that one or more components of the computer system 1000 may be located remotely and accessed via the network. The digital image editing program 100 may be implemented in various embodiments using any desired programming language, scripting language, or combination of programming languages and/or scripting languages, e.g., C, C++, C#, Java™, Perl, etc. It will be apparent to those having ordinary skill in the art that computer system 1000 can also include numerous elements not shown in FIG. 10, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
performing by a computer:
generating a first raster image mask in a digital image, wherein the first raster image mask comprises a first set of one or more pixels having a first intermediate value for membership in the first raster image mask, wherein the first intermediate value is less than a maximum value for membership in the first raster image mask and greater than a minimum value for membership in the first raster image mask;
generating a second raster image mask in the digital image, wherein the second raster image mask comprises the first set of one or more pixels having a second intermediate value for membership in the second raster image mask, wherein the second intermediate value is less than a maximum value for membership in the second raster image mask and greater than a minimum value for membership in the second raster image mask; and combining the first raster image mask and the second raster image mask to generate a third raster image mask in the digital image, wherein a boundary of the third raster image mask is not greater than a combined boundary of the first raster image mask and the second raster image mask.

2. The method as recited in claim 1, wherein combining the first raster image mask and the second raster image mask comprises adding the first raster image mask to the second raster image mask to generate the third raster image mask, wherein each pixel in the third raster image mask has a maximum of a respective value in the first raster image mask and a respective value in the second raster image mask.

3. The method as recited in claim 1, wherein combining the first raster image mask and the second raster image mask comprises adding the first raster image mask to the second raster image mask to generate the third raster image mask, wherein each pixel in the third raster image mask has a value of a respective value in the first raster image mask plus a respective value in the second raster image mask minus a square root of a product of the respective value in the first raster image mask and the respective value in the second raster image mask.

4. The method as recited in claim 1, wherein combining the first raster image mask and the second raster image mask comprises using an idempotent addition operation to generate the third raster image mask.

5. The method as recited in claim 1, wherein combining the first raster image mask and the second raster image mask comprises subtracting the first raster image mask from the second raster image mask or subtracting the second raster image mask from the first raster image mask to generate the third raster image mask, wherein each pixel in the third raster image mask has a minimum of a respective value in the first raster image mask and a respective value in the second raster image mask.

6. The method as recited in claim 1, wherein combining the first raster image mask and the second raster image mask comprises subtracting the first raster image mask from the second raster image mask or subtracting the second raster image mask from the first raster image mask to generate the third raster image mask, wherein each pixel in the third raster image mask has a value of a respective value in the first raster image mask plus a respective value in the second raster image mask minus one plus a square root of a product of a complement of the respective value in the first raster image mask and a complement of the respective value in the second raster image mask.

7. The method as recited in claim 1, wherein combining the first raster image mask and the second raster image mask comprises using an idempotent subtraction operation to generate the third raster image mask.

8. The method as recited in claim 1, wherein the first raster image mask, the second raster image mask, and the third raster image mask each comprises a selection.

9. The method as recited in claim 1, wherein the first raster image mask, the second raster image mask, and the third raster image mask each comprises a brush stroke.

10. The method as recited in claim 1, wherein the first raster image mask or the second raster image mask is generated by a graph-cut technique.

11. The method as recited in claim 1, wherein the first raster image mask or the second raster image mask is defined by a path.

12. The method as recited in claim 1, wherein the first raster image mask and the second raster image mask are combined dynamically in response to user input.

13. A computer-readable storage medium, comprising program instructions, wherein the program instructions are computer-executable to implement:
    generating a first raster image mask in a digital image, wherein the first raster image mask comprises a first set of one or more pixels having a first intermediate value for membership in the first raster image mask, wherein the first intermediate value is less than a maximum value for membership in the first raster image mask and greater than a minimum value for membership in the first raster image mask;
    generating a second raster image mask in the digital image, wherein the second raster image mask comprises the first set of one or more pixels having a second intermediate value for membership in the second raster image mask, wherein the second intermediate value is less than a maximum value for membership in the second raster image mask and greater than a minimum value for membership in the second raster image mask; and
    combining the first raster image mask and the second raster image mask to generate a third raster image mask in the digital image, wherein a boundary of the third raster image mask is not greater than a combined boundary of the first raster image mask and the second raster image mask.

14. The computer-readable storage medium as recited in claim 13, wherein combining the first raster image mask and the second raster image mask comprises adding the first raster image mask to the second raster image mask to generate the third raster image mask, wherein each pixel in the third raster image mask has a maximum of a respective value in the first raster image mask and a respective value in the second raster image mask.

15. The computer-readable storage medium as recited in claim 13, wherein combining the first raster image mask and the second raster image mask comprises adding the first raster image mask to the second raster image mask to generate the third raster image mask, wherein each pixel in the third raster image mask has a value of a respective value in the first raster image mask plus a respective value in the second raster image mask minus a square root of a product of the respective value in the first raster image mask and the respective value in the second raster image mask.

16. The computer-readable storage medium as recited in claim 13, wherein combining the first raster image mask and the second raster image mask comprises using an idempotent addition operation to generate the third raster image mask.

17. The computer-readable storage medium as recited in claim 13, wherein combining the first raster image mask and the second raster image mask comprises subtracting the first raster image mask from the second raster image mask or subtracting the second raster image mask from the first raster image mask to generate the third raster image mask, wherein each pixel in the third raster image mask has a minimum of a respective value in the first raster image mask and a respective value in the second raster image mask.

18. The computer-readable storage medium as recited in claim 13, wherein combining the first raster image mask and the second raster image mask comprises subtracting the first raster image mask from the second raster image mask or subtracting the second raster image mask from the first raster image mask to generate the third raster image mask, wherein each pixel in the third raster image mask has a value of a respective value in the first raster image mask plus a respective value in the second raster image mask minus one plus a square root of a product of a complement of the respective value in the first raster image mask and a complement of the respective value in the second raster image mask.

19. The computer-readable storage medium as recited in claim 13, wherein combining the first raster image mask and the second raster image mask comprises using an idempotent subtraction operation to generate the third raster image mask.

20. The computer-readable storage medium as recited in claim 13, wherein the first raster image mask, the second raster image mask, and the third raster image mask each comprises a selection.

21. The computer-readable storage medium as recited in claim 13, wherein the first raster image mask, the second raster image mask, and the third raster image mask each comprises a brush stroke.

22. The computer-readable storage medium as recited in claim 13, wherein the first raster image mask or the second raster image mask is generated by a graph-cut technique.

23. The computer-readable storage medium as recited in claim 13, wherein the first raster image mask or the second raster image mask is defined by a path.

24. The computer-readable storage medium as recited in claim 13, wherein the first raster image mask and the second raster image mask are combined dynamically in response to user input.

25. A system, comprising:
at least one processor;
a memory coupled to the at least one processor, wherein the memory is configured to store program instructions executable by the at least one processor to:
generate a first raster image mask in a digital image, wherein the first raster image mask comprises a first set of one or more pixels having a first intermediate value for membership in the first raster image mask, wherein the first intermediate value is less than a maximum value for membership in the first raster image mask and greater than a minimum value for membership in the first raster image mask;
generate a second raster image mask in the digital image, wherein the second raster image mask comprises the first set of one or more pixels having a second intermediate value for membership in the second raster image mask, wherein the second intermediate value is less than a maximum value for membership in the second raster image mask and greater than a minimum value for membership in the second raster image mask; and
combine the first raster image mask and the second raster image mask to generate a third raster image mask in the digital image, wherein a boundary of the third raster image mask is not greater than a combined boundary of the first raster image mask and the second raster image mask.

26. The system as recited in claim 25, wherein, in combining the first raster image mask and the second raster image mask, the program instructions are further executable by the at least one processor to add the first raster image mask to the second raster image mask to generate the third raster image mask, wherein each pixel in the third raster image mask has a maximum of a respective value in the first raster image mask and a respective value in the second raster image mask.

27. The system as recited in claim 25, wherein, in combining the first raster image mask and the second raster image mask, the program instructions are further executable by the at least one processor to add the first raster image mask to the second raster image mask to generate the third raster image mask, wherein each pixel in the third raster image mask has a value of a respective value in the first raster image mask plus a respective value in the second raster image mask minus a square root of a product of the respective value in the first raster image mask and the respective value in the second raster image mask.

28. The system as recited in claim 25, wherein, in combining the first raster image mask and the second raster image mask, the program instructions are further executable by the at least one processor to use an idempotent addition operation to generate the third raster image mask.

29. The system as recited in claim 25, wherein, in combining the first raster image mask and the second raster image mask, the program instructions are further executable by the at least one processor to subtract the first raster image mask from the second raster image mask or subtract the second raster image mask from the first raster image mask to generate the third raster image mask, wherein each pixel in the third raster image mask has a minimum of a respective value in the first raster image mask and a respective value in the second raster image mask.

30. The system as recited in claim 25, wherein, in combining the first raster image mask and the second raster image mask, the program instructions are further executable by the at least one processor to subtract the first raster image mask from the second raster image mask or subtract the second raster image mask from the first raster image mask to generate the third raster image mask, wherein each pixel in the third raster image mask has a value of a respective value in the first raster image mask plus a respective value in the second raster image mask minus one plus a square root of a product of a complement of the respective value in the first raster image mask and a complement of the respective value in the second raster image mask.

31. The system as recited in claim 25, wherein, in combining the first raster image mask and the second raster image mask, the program instructions are further executable by the at least one processor to use an idempotent subtraction operation to generate the third raster image mask.

32. The system as recited in claim 25, wherein the first raster image mask, the second raster image mask, and the third raster image mask each comprises a selection.

33. The system as recited in claim 25, wherein the first raster image mask, the second raster image mask, and the third raster image mask each comprises a brush stroke.

34. The system as recited in claim 25, wherein the first raster image mask or the second raster image mask is generated by a graph-cut technique.

35. The system as recited in claim 25, wherein the first raster image mask or the second raster image mask is defined by a path.

36. The system as recited in claim 25, wherein the first raster image mask and the second raster image mask are combined dynamically in response to user input.

* * * * *